United States Patent [19]

Auxier et al.

[11] Patent Number: 4,773,593
[45] Date of Patent: Sep. 27, 1988

[54] COOLABLE THIN METAL SHEET

[75] Inventors: Thomas A. Auxier, Palm Beach Gardens, Fla.; Kenneth W. Stalker, Fayetteville, Ark.; Anthony M. Zimmerman, Palm Beach Gardens, Fla.

[73] Assignee: United Technologies Corporation, Hartford, Conn.

[21] Appl. No.: 45,345

[22] Filed: May 4, 1987

[51] Int. Cl.4 .............................................. F02C 7/18
[52] U.S. Cl. .................................................. 239/127.3
[58] Field of Search ............... 60/262, 265, 271, 752, 60/754–759; 239/127.1, 127.3, 265.19

[56] References Cited

U.S. PATENT DOCUMENTS

| | | | |
|---|---|---|---|
| 2,477,583 | 8/1949 | De Zubuy et al. | 60/759 X |
| 2,510,695 | 6/1950 | McMahon | 60/759 X |
| 2,782,597 | 2/1957 | Parsons et al. | 60/759 X |
| 2,993,337 | 7/1961 | Cheeseman | 60/759 X |
| 3,077,073 | 2/1963 | Kuhrt | 60/35.6 |
| 3,091,924 | 6/1963 | Wilder, Jr. | 60/35.54 |
| 3,447,318 | 6/1969 | Caruel et al. | 60/757 |
| 3,623,711 | 11/1971 | Thorstenson | 263/19 A |
| 3,864,199 | 2/1975 | Meginnis | 161/112 |
| 3,866,417 | 2/1975 | Velegol | 60/261 |
| 4,050,241 | 9/1977 | Dubell | 60/39.66 |
| 4,071,194 | 1/1978 | Eckert et al. | 239/127.3 |
| 4,077,205 | 3/1978 | Pane et al. | 60/39.32 |
| 4,081,137 | 3/1978 | Sutton et al. | 239/127.3 |
| 4,161,231 | 7/1979 | Wilkinson | 181/292 |
| 4,206,865 | 6/1980 | Miller | 228/152 |
| 4,292,376 | 9/1981 | Hustler | 428/293 |
| 4,529,358 | 7/1985 | Papell | 416/97 A |

Primary Examiner—Andres Kashnikow
Assistant Examiner—Kevin Patrick Weldon
Attorney, Agent, or Firm—William J. Sapone

[57] ABSTRACT

A coolable thin metal sheet incorporated in an exhaust nozzle for a gas turbine powered aircraft includes a hot surface, a cool surface and a plurality of triangular sloped depressions which project through the cold gas side of the sheet. Each depression includes a gradually sloped essentially triangular surface which extends gradually in the direction of flow, from a deep, flat faced apex to a flush base, with the apex providing a flat surface perpendicular to the sloped surface. A hole, drilled through the apex admits cooling air which forms a film on the hot gas surface. Utilizing a plurality of such depressions provides precise control of the quantity and direction of cooling gas admitted while allowing use of the thinnest material meeting mechanical requirements, providing optimized film cooling while minimizing nozzle weight.

4 Claims, 2 Drawing Sheets

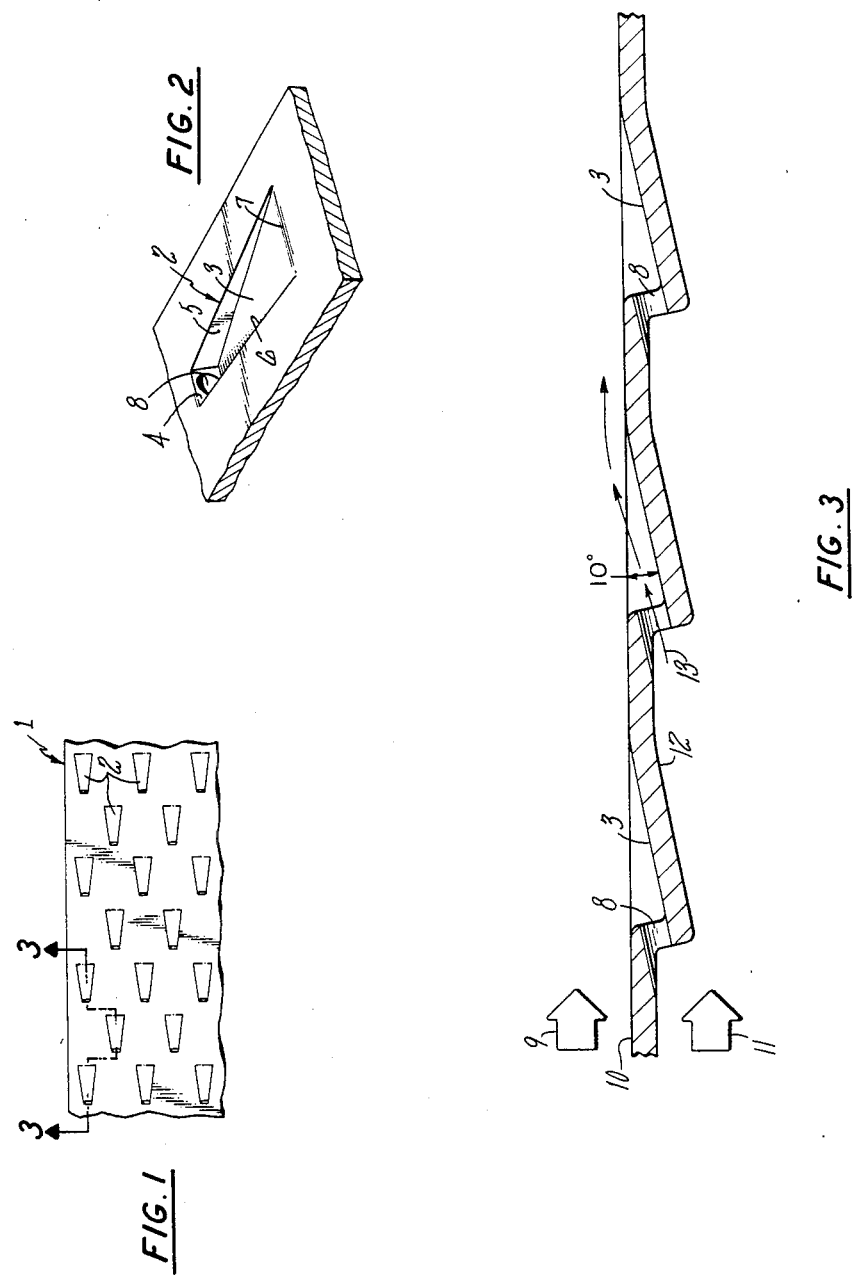

COOLABLE THIN METAL SHEET

This invention is made with Government support under a contract awarded by the Department of the Air Force. The Government has certain rights in this invention.

DESCRIPTION

1. Technical Field

This invention relates to thin metal sheets which are exposed to high temperature gas and more particularly to thin metal sheets having holes through which cooling air is directed at an angle to provide film cooling of the sheet.

2. Background Art

Perforated sheets for providing a boundary layer between hot and cold gaseous fluids are known. In U.S. Pat. No. 3,864,199 to Meginnis, a porous laminated sheet is formed of two layers bonded together, each layer having pores distributed over its surface with the pores of the layers out of register with each other. Bosses are distributed over the inner surface of the outer layer to direct the cooling airflow angularly, thereby providing discharge at a substantial angle. In U.S. Pat. No. 3,623,711, a combustor liner includes a plurality of triangular shaped openings in a flat sheet which provide a porous type structure. FIG. 1 of this patent illustrates the relative size of the pores 22 in comparison to conventional cooling holes 18 and 22. Such pores are difficult to provide in a thin metal sheet without deleteriously affecting the mechanical strength of the sheet.

A two-dimensional exhaust gas nozzle for a gas turbine engine powered aircraft includes static sidewalls and movable flaps which control the direction and rate of exhaust flow in response to pilot command. To survive the high exhaust temperatures (up to 2300° C.), relatively cool compressor gas is ducted from the engine to the flaps and sidewalls and bled over the hot gas contacting surfaces. Of course, bleedingo the compressor gas reduces engine efficiency requiring optimization of the cooling gas requirement.

Generally, the sidewalls and/or nozzle flaps incorporate metal sheets which provide the boundary between the hot and cool co-currently flowing gases. To optimize power to weight ratios, it is desirable to utilize the thinnest metal sheet meeting mechanical and thermal requirements. Such a thin metal sheet includes openings through which cooling air is directed at an acute angle to produce a cooling film over the sheet surface in contact with the hot gas stream. The acute angle directs the cooling gas nearly parallel to the surface to minimize intermixing with the hot gas, optimizing the film temperature differential at initiation and enhancing long term cooling effectiveness. Attempts at drilling holes at an acute angle through a thin, flat metal sheet, having a thickness of about 0.014 inches, produced eliptical passages which did not effectively direct the cooling gas at the acute angle desired, producing instead perpendicular gas flow and substantial intermixing with the additional open area provided by the eliptical passages allowing excessive quantities of cooling gas to pass therethrough. Generally, angled holes are only effective where the sheet metal is of sufficient thickness to provide a sloped passage. Utilizing such a thick sheet in a nozzle assembly would add substantially to nozzle weight. Consequently, what is needed in the art is a coolable thin metal sheet having cooling holes which provide precise control of the angle and quantity of cooling gas passing therethrough.

DISCLOSURE OF INVENTION

According to the present invention, a coolable thin metal sheet includes a hot surface in contact with a hot gas, a cool surface in contact with a cool gas, and, means for passing the cool gas therethrough for film cooling the hot surface. Such means comprise a plurality of essentially triangular shaped depressions, with each depression forming a corresponding projection onto the cool surface. Each depression includes a gradually sloped, essentially triangular surface extending in the direction of hot gas flow from a deep, flat faced apex to a flush base. The flat surface at the deep apex of the triangle is disposed normal to the sloped, triangular surface. A hole formed through the flat surface provides precise diametric control as drilling is done normal to the flat surface, with the angle of the airflow controlled by the angle of the flat surface. The gradually expanding essentially triangular surface spreads the cooling gas admitted through the hole into a flat profile for a smooth transition into film flow.

BRIEF DESCRIPTION OF THE DRAWINGS

FIG. 1 shows a thin metal sheet illustrating a typical hole pattern.

FIG. 2 is an enlarged view of a typical triangular shaped depression including a hole extending through the flat apex.

FIG. 3 is an enlarged cross-sectional view of the thin metal sheet taken along line 3—3 of FIG. 1.

BEST MODE FOR CARRYING OUT THE INVENTION

Figure 4:
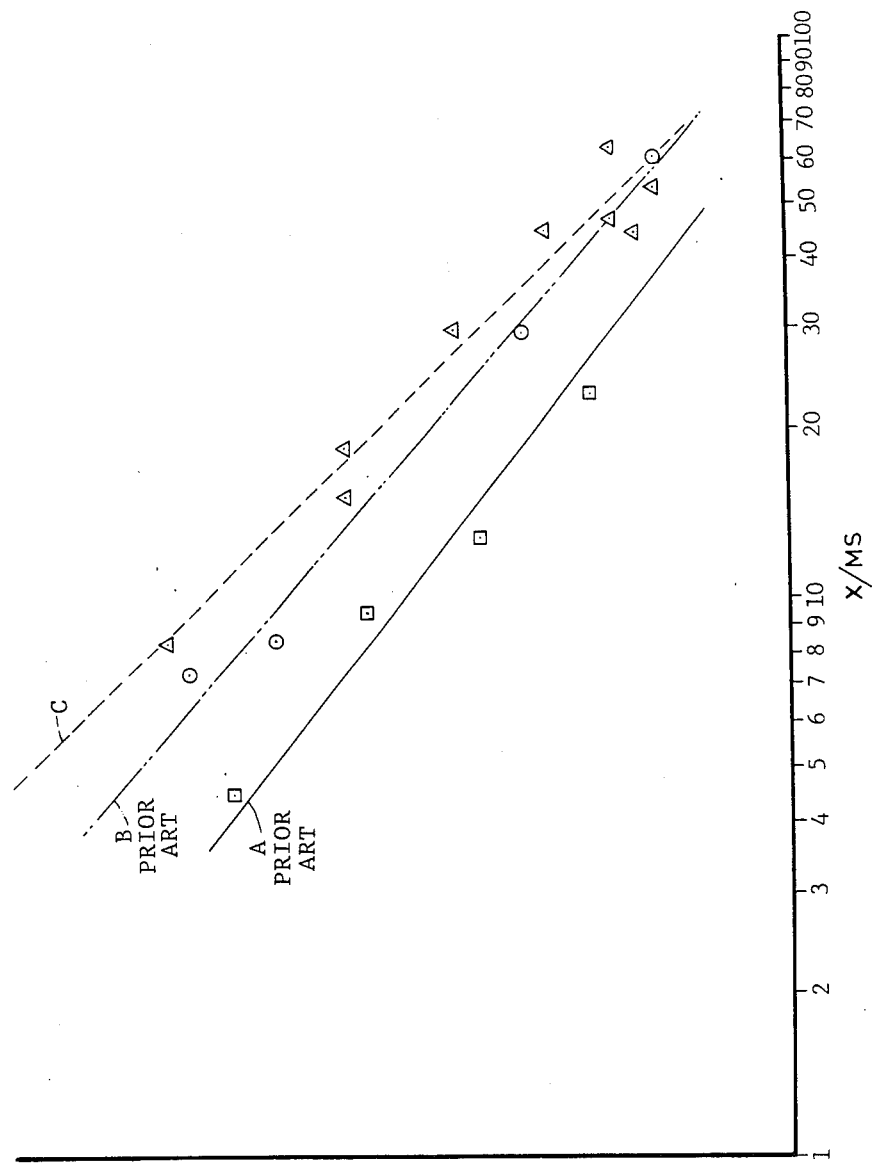
FIG. 4 is a graph comparing film cooling efficiencies between prior art normal holes provided in a flat sheet (A), prior art angled holes provided in a flat sheet (B) and normal holes provided through the apex of a triangular depression (C).

Referring to FIG. 1, a thin metal sheet 1, having a thickness of about 0.014 inches, is shown which is particularly useful for incorporation in an exhaust gas nozzle for a gas turbine powered aircraft. The thin sheet for the purposes of this application, is defined as one having a thickness between 0.010 and 0.030 inches, and includes a plurality of triangular sloped depressions 2. While a triangular depression is shown, it will be understood by those skilled in the art that other essentially triangular depressions which provide an expanding surface in the direction of flow may be used in the present invention. For illustrative purposes, the depressions are shown to be approximately 0.20 inches center-to-center in a row, with each row spaced at 0.17 inches row-to-row. Each row is staggered to evenly distribute the cooling flow across the hot gas surface. For exemolary purposes, approximately 378 cooling holes are provided in a 3"×7" rectangular sheet.

Referring to FIG. 2, an enlarged view of the thin sheet is shown illustrating a typical triangular depression 2. The depression 2 includes a sloping triangular surface 3, a flat apex 4, sidewalls 5 and 6 and a flush base 7. The flat apex 4 is provided perpendicular to the sloped triangular surface. A hole 8, such as one having a diameter of about 0.020 inches, is drilled, punched or otherwise provided normal to the flat apex of each depressed triangle for directing cooling flow at a desired flow angle, preferably between 5° and 20°. The cooling gas is then admitted through the hole and distributed across the expanding sloped triangular surface, providing a smooth transition to film cooling.

Referring to FIG. 3, a cross-sectional view of the thin metal sheet is shown taken along the line 3—3 of FIG. 1. A hot gas, illustrated by the arrow 9 flows across a hot gas surface 10. A cool gas, illustrated by the arrow 11, flows across a cool gas surface 12. The cool gas impinges on the flat apexes, with a portion of the cool gas driven through the holes 8 onto the sloped triangular surface 3. In FIG. 3, the angle of the sloped surface is 10° with the flat apex perpendicular thereto. The cool gas then spreads laterally into a thin film, illustrated by the arrow 13, which protects the hot surface from the hot exhaust gas. Maintaining the cool gas at a positive pressure prevents the hot gas from inhibiting the cool gas flow. Since the holes 8 are provided normal to the flat surface 4, a precise hole size is achieved which provides accurate control of the quantity of cooling gas admitted.

Referring to FIG. 4, the results of wind tunnel film cooling tests are shown in graphical form for sheet metal liners having prior art normal holes (line A), prior art angled holes provided in a flat sheet (line B), and the holes provided at the apex of the triangular depressions utilized in the inventive thin metal sheet (line C). The graph represents cooling efficiency, measured as $(T_h-T_f)/(T_h-T_c)$, versus a dimensionless flow factor, X/MS where:

$T_h$=Temp, Hot Gas
$T_c$=Temp, Cool Gas
$T_f$=Temp, Film
X=Distance Downstream of Hole
M=$(\rho_c V_c(\rho_h V_h)$, where $\rho$ is density and V is velocity
S=Equivalent Slot Height, measured as the open area provided by a row of holes divided by the row length In essence, the graph represents the effectiveness of the film downstream of film initiation. From the graph, it is seen that film cooling is much more effective with the inventive holes, providing up to a 26% increase in cooling efficiency. Such an increase allows reducing the number of holes or otherwise simplifying the design of the thin sheet, reducing costs while optmizing the fatigue life.

Thin sheets may be stamped with a plurality of sloped triangular depressions in one operation using a pair of matched dies. The sheets may then have a plurality of holes drilled, stamped, punched or otherwise provided using a second set of dies. Such a procedure minimizes sheet distortion while optimizing processing time. By providing a flat surface for each hole, the hole diameter is controllable and eliptical passages are avoided, allowing precise control of the cooling gas flow. Since the hot side surface retains a flat profile, additional drag is not induced. In addition, the conductive heat transfer coefficient through the sheet surface is increased due to increased turbulence caused by the shaped projections extending into the cooling gas flow. Since the sheet thickness is now noncritical to the accomplishment of precise directional cooling airflow, the thinnest material meeting the mechanical requirements of the exhaust gas nozzle can be used, reducing weight in the exhaust gas nozzle assembly.

While this invention has been shown and described in relation to a thin metal sheet adapted for use in an exhaust gas nozzle of a gas turbine engine, it will be understood by those skilled in the art that other assemblies requiring coolable thin metal sheets coul benefit from the present invention. Consequently, it will be understood by those skilled in the art that modifications in terms of depression distribution, material type, manufacturing means, hole size or flow angle can be made without varying from the scope of the present invention.

Having thus described the invention, what is claimed is:

1. A coolable thin metal sheet including a hot surface in contact with a hot gas; a cool surface in contact with a cool gas; and, means for passing the cool gas therethrough for film cooling the hot surface, said means comprising:

a plurality of essentially triangular depressions disposed about the thin metal sheet, each depression forming a corresponding triangular projection onto the cool surface, each depression including a gradually sloped essentially triangular surface extending in the direction of hot gas flow from a deep flat faced apex to a flush base, the flat faced apex being perpendicular to the sloped surface, and having a hole formed normal thereto, said hole providing a precise opening for passing the cool gas therethrough 2. The thin metal sheet of claim 1 wherein said triangular surface is sloped from 5° to 20°.

3. An exhaust gas nozzle for a gas turbine engine powered aircraft which includes static sidewalls and movable flaps for directing a hot exhaust gas therethrough, said sidewalls or said flaps incorporating thin metal sheets, said sheets including a hot surface in contact with the exhaust gas, a cool surface in contact with a cooling gas and, means for passing the cooling gas therethrough for film cooling the hot surface, said means comprising:

a plurality of essentially triangular depressions disposed about the thin metal sheet, each depression forming a corresponding triangular projection onto the cool surface, each depression including a gradually sloped essentially triangular surface extending in the direction of hot gas flow from a deep flat faced apex to a flush base, the flat faced apex being perpendicular to the sloped surface and having a hole formed normal thereto, said hole providing a precise opening for passing the cooling gas therethrough.

4. The exhaust gas nozzle of claim 3 wherein said triangular surface is sloped from 5° to 20°.

* * * * *

UNITED STATES PATENT AND TRADEMARK OFFICE
CERTIFICATE OF CORRECTION

PATENT NO. : 4,773,593
DATED : September 27, 1988
INVENTOR(S) : THOMAS A. AUXIER ET AL It is certified that error appears in the above-identified patent and that said Letters Patent is hereby corrected as shown below:

Col. 1, line 40: delete "bleedingo" and insert --bleeding--

Col. 3, line 34: delete "$(\rho_c V_c (\rho_h V_h)$" and insert --$(\rho_c V_c)/(\rho_h V_h)$ Col. 4, line 10: delete "coul" and insert --could"

Signed and Sealed this

Thirty-first Day of January, 1989

Attest:

DONALD J. QUIGG

*Attesting Officer*   *Commissioner of Patents and Trademarks*